(12) United States Patent
Hajri et al.

(10) Patent No.: US 12,262,384 B2
(45) Date of Patent: Mar. 25, 2025

(54) APPARATUS, METHOD AND COMPUTER PROGRAM FOR UPLINK CONTROL SIGNALLING

(71) Applicant: NOKIA TECHNOLOGIES OY, Espoo (FI)

(72) Inventors: Salah Eddine Hajri, Antony (FR); Filippo Tosato, Bures sur Yvette (FR); Luca Rose, Orsay (FR); Axel Mueller, Paris (FR); Marco Maso, Issy les Moulineaux (FR)

(73) Assignee: Nokia Technologies Oy, Espoo (FI)

( * ) Notice: Subject to any disclaimer, the term of this patent is extended or adjusted under 35 U.S.C. 154(b) by 266 days.

(21) Appl. No.: 17/632,473

(22) PCT Filed: Aug. 16, 2019

(86) PCT No.: PCT/EP2019/071992
§ 371 (c)(1),
(2) Date: Feb. 2, 2022

(87) PCT Pub. No.: WO2021/032263
PCT Pub. Date: Feb. 25, 2021

(65) Prior Publication Data
US 2022/0279506 A1  Sep. 1, 2022

(51) Int. Cl.
*H04W 72/21* (2023.01)
*H04B 7/0456* (2017.01)
*H04L 5/00* (2006.01)

(52) U.S. Cl.
CPC .......... *H04W 72/21* (2023.01); *H04B 7/0456* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2010/0091904 A1 | 4/2010 | Wang et al. | |
| 2015/0341093 A1* | 11/2015 | Ji | H04B 7/0658 375/267 |
| 2016/0182137 A1* | 6/2016 | Onggosanusi | H04B 7/0478 370/329 |

(Continued)

FOREIGN PATENT DOCUMENTS

| | | |
|---|---|---|
| CN | 109219935 A | 1/2019 |
| CN | 110050413 A | 7/2019 |

(Continued)

OTHER PUBLICATIONS

First Examination Report for India Application No. 202217003482, mailed on Apr. 29, 2022, 6 pages.

(Continued)

*Primary Examiner* — Anh Vu H Ly
(74) *Attorney, Agent, or Firm* — Brake Hughes Bellermann LLP (57) ABSTRACT

An apparatus comprising means for performing: grouping columns of a linear combination coefficient matrix into a predefined number of clusters; and sending at least one of the clusters in a second part of a uplink control signalling transmission of a channel to an access node, wherein the uplink control signalling transmission comprises a first part and the second part.

19 Claims, 6 Drawing Sheets

(56) References Cited

U.S. PATENT DOCUMENTS

2020/0162142 A1* 5/2020 Rahman ............... H04B 7/0639
2020/0295812 A1* 9/2020 Rahman ............... H04B 7/0626

FOREIGN PATENT DOCUMENTS

| EP | 3324550 A1 * | 5/2018 | ............... H04B 7/04 |
|----|------|------|------|
| WO | WO-2016114635 A1 * | 7/2016 | ........... H04B 7/0404 |
| WO | 2018202055 A1 | 11/2018 | |
| WO | 2018223351 A1 | 12/2018 | |
| WO | 2019047754 A1 | 3/2019 | |
| WO | 2019071383 A1 | 4/2019 | |

OTHER PUBLICATIONS

International Search Report and Written Opinion for International Application No. PCT/EP2019/071992; mailed Mar. 24, 2020; 13 pages.
3GPP TSG RAN WG1 Ad-Hoc Meeting #AH1901, R1-1900690; "CSI Enhancements for MU-MIMO"; Taipei, Taiwan; Jan. 21-25, 2019; 17 pages.
3GPP TSG-RAN WG1 96, R1-1902700; "Discussion on Overhead Reduction for Type II CSI Feedback", Athens, Greece; Feb. 25-Mar. 1, 2019; 7 pages.
3GPP TSG-RAN WG1 #89, R1-1709232; "WF on Type I and II CSI Codebooks", Hangzhou, China; May 15-19, 2017; 24 pages.
3GPP TSG RAN WG1 Meeting #95, R1-1813002; "Summary of CSI Enhancement for MU-MIMO Support"; Spokane, Washington, USA; Nov. 12-16, 2018; 9 pages.
3GPP TSG RAN WG1 Meeting #96, R1-1902562; "CSI Overhead Reduction for Type II Codebook up to Rank 2"; Athens, Greece; Feb. 24-Mar. 1, 2019; 17 pages.
3GPP TSG RAN WG1 97, R1-1906965; "Feature Lead Summary for MU-MIMO CSI"; Reno, Nevada, USA; May 13-17, 2019; 20 pages.
3GPP TSG RAN WG1 97, R1-1906966; "Feature Lead Summary on Offline Email Discussion for MU-MIMO CSI: UCI Parameters", Reno, Nevada, USA; May 13-17, 2019; 6 pages.
3GPP TSG RAN WG1 97, R1-1906967; "Feature Lead Summary on Offline Email Discussion for MU-MIMO CSI: FD Basis Subset Selection"; Reno, Nevada, USA; May 13-17, 2019; 3 pages.
3GPP TSG RAN WG1 Meeting #97, R1-1907315; "MU-CSI Rank Extension Parameter Setting and UCI Design"; Reno, Nevada, USA; May 13-17, 2019; 13 pages.
3GPP TSG RAN WG1 Meeting #97, R1-1907319; "On UCI Reporting of SCI and FD Basis"; Reno, Nevada, USA; May 13-17, 2019; 4 pages.
3GPP TSG RAN WG1 Meeting #97, R1-1907719; "On the Proposals for Rel-16 Codebook Strongest Coefficient Indicator"; Reno, Nevada, USA; May 13-17, 2019, 4 pages.
3GPP TS 38.214, V1.2.0; 3rd Generation Partnership Project; Technical Specification Group Radio Access Network; NR; Physical Layer Procedures for Data (Release 15); Sophia Antipolis, Valbonne, France; Nov. 2017; 54 pages.
Office Action and Search Report for Chinese Patent Application No. 201980099419.8, mailed on Jan. 26, 2024, 9 pages.
3GPP TSG RAN WG1 Meeting #96, R1-1903343; "CSI Enhancement for MU-MIMO Support"; Source: ZTE; Agenda Item: 7.2.8.1; Athens, Greece; Feb. 25-Mar. 1, 2019; 15 pages.
3GPP TSG RAN WG1 Meeting RAN1#96-bis; R1-1905110; "On CSI enhancements for MU-MIMO"; Source: Ericsson; Agenda Item: 7.2.8.1; Xi'an, China; Apr. 8-12, 2019; 13 pages.
Office Action for Chinese Patent Application No. 201980099419.8, mailed on Aug. 30, 2024, 12 pages.
Communication pursuant to Article 94(3) EPC for European Application No. 19758650.6, mailed Jun. 7, 2024, 3 pages.
Communication pursuant to Article 94(3) EPC for European Application No. 19758650.6, mailed on Jan. 10, 2025, 4 pages.
Office Action for Chinese Patent Application No. 201980099419.8, mailed on Nov. 13, 2024, 12 pages (including machine translation).

* cited by examiner

S601 — Receiving, from a user equipment, at least one cluster in a second part of a uplink control signalling transmission of a channel, wherein the uplink control signalling transmission comprises a first part and the second part; wherein the at least one cluster is formed by the user equipment grouping columns of a linear combination coefficient matrix into a number of clusters

APPARATUS, METHOD AND COMPUTER PROGRAM FOR UPLINK CONTROL SIGNALLING

CROSS-REFERENCE TO RELATED APPLICATIONS

This application is a national stage entry of International Application No. PCT/EP2019/071992, filed Aug. 16, 2019, entitled "APPARATUS, METHOD AND COMPUTER PROGRAM FOR UPLINK CONTROL SIGNALLING" which is hereby incorporated by reference in its entirety.

TECHNICAL FIELD

This disclosure relates to a communications network. More particularly, the present disclosure relates to reporting the status of a wireless channel. The present disclosure may be utilised, for example, in the field of telecommunications.

BACKGROUND

A User Equipment (UE) and access node (e.g. a gNB) may be connected via a wireless channel. A UE may send Channel State Information (CSI) reports in an uplink direction to the access node to update the access node with the status of the wireless channel.

STATEMENT OF INVENTION

According to a first aspect there is provided an apparatus comprising means for performing: grouping columns of a linear combination coefficient matrix into a predefined number of clusters; and sending at least one of the clusters in a second part of an uplink control signalling transmission of a channel to an access node, wherein the uplink control signalling transmission comprises a first part and the second part.

According to some examples, the uplink control signalling transmission comprises a channel state information report.

According to some examples, the grouping columns of the linear combination coefficient matrix into a predefined number of clusters is based on frequency domain components indices associated to linear combination coefficients of the linear combination coefficient matrix or is based on the amplitudes of the linear combination coefficients of the linear combination coefficient matrix.

According to some examples, the predefined number of clusters is at least one of: specific to a rank indicator of the channel; common across different rank indicators of the channel; specific to a spatial layer of the channel; and common across different spatial layers of the channel.

According to some examples, the uplink control signalling transmission comprises a frequency domain compressed type II channel state information report.

According to some examples, wherein the means are further configured to perform: receiving, in a radio resource configuration message, a number of frequency domain components per cluster in each spatial layer and a maximum number of non-zero linear combination coefficients per cluster in each spatial layer.

According to some examples, the means are further configured to perform: determining, from type II codebook parameters, a number of frequency domain components per cluster in each spatial layer and a maximum number of non-zero linear combination coefficients per cluster in each spatial layer.

According to some examples, the type II codebook parameters comprise L, p, β and α parameters.

According to some examples, the means are further configured to perform: assigning an index to each of the clusters based on a priority criterion, wherein lower indices are assigned for higher priority clusters.

According to some examples, the priority criterion comprises at least one of: an average amplitude of linear combination coefficients per cluster; a total amplitude of linear combination coefficients per cluster; and indices of the frequency domain components associated to the linear combination coefficients.

According to some examples, when physical uplink shared channel resources are not sufficient to send all of the clusters to the access node, the means are further configured to perform: omitting higher index clusters from the second part of the uplink control signalling transmission such that the second part of the uplink control signalling transmission can be accommodated on the physical uplink shared channel scheduled resources.

According to some examples, the means are further configured to perform: indicating, in the first part of the uplink control signalling transmission, a presence of at least one omissions of a cluster from the second part of the uplink control signalling transmission.

According to some examples, the indicator is either a standalone bit sequence or a joint encoding with another indicator.

According to some examples, the apparatus is a user equipment.

According to a second aspect there is provided an apparatus comprising at least one processor; and at least one memory including computer program code; the at least one memory and the computer program code configured to, with the at least one processor, cause the apparatus at least to perform: grouping columns of a linear combination coefficient matrix into a predefined number of clusters; and sending at least one of the clusters in a second part of an uplink control signalling transmission of a channel to an access node, wherein the uplink control signalling transmission comprises a first part and the second part.

According to some examples, the uplink control signalling transmission comprises a channel state information report.

According to some examples, the grouping columns of the linear combination coefficient matrix into a predefined number of clusters is based on frequency domain components indices associated to linear combination coefficients of the linear combination coefficient matrix or is based on the amplitudes of the linear combination coefficients of the linear combination coefficient matrix.

According to some examples, the predefined number of clusters is at least one of: specific to a rank indicator of the channel; common across different rank indicators of the channel; specific to a spatial layer of the channel; and common across different spatial layers of the channel.

According to some examples, the uplink control signalling transmission comprises a frequency domain compressed type II channel state information report.

According to some examples, the at least one memory and the computer program code are configured to, with the at least one processor, cause the apparatus at least to perform: receiving, in a radio resource configuration message, a number of frequency domain components per cluster in each spatial layer and a maximum number of non-zero linear combination coefficients per cluster in each spatial layer.

According to some examples, the at least one memory and the computer program code are configured to, with the at least one processor, cause the apparatus at least to perform: determining, from type II codebook parameters, a number of frequency domain components per cluster in each spatial layer and a maximum number of non-zero linear combination coefficients per cluster in each spatial layer.

According to some examples, the type II codebook parameters comprise L, p, β and α parameters.

According to some examples, the at least one memory and the computer program code are configured to, with the at least one processor, cause the apparatus at least to perform: assigning an index to each of the clusters based on a priority criterion, wherein lower indices are assigned for higher priority clusters.

According to some examples, the priority criterion comprises at least one of: an average amplitude of linear combination coefficients per cluster; a total amplitude of linear combination coefficients per cluster; and indices of the frequency domain components associated to the linear combination coefficients.

According to some examples, when physical uplink shared channel resources are not sufficient to send all of the clusters to the access node, the at least one memory and the computer program code are configured to, with the at least one processor, cause the apparatus at least to perform: omitting higher index clusters from the second part of the uplink control signalling transmission such that the second part of the uplink control signalling transmission can be accommodated on the physical uplink shared channel scheduled resources.

According to some examples, the at least one memory and the computer program code are configured to, with the at least one processor, cause the apparatus at least to perform: indicating, in the first part of the uplink control signalling transmission, a presence of at least one omissions of a cluster from the second part of the uplink control signalling transmission.

According to some examples, the indicator is either a standalone bit sequence or a joint encoding with another indicator.

According to some examples, the apparatus is a user equipment.

According to a third aspect there is provided an apparatus comprising: circuitry for grouping columns of a linear combination coefficient matrix into a predefined number of clusters; and circuitry for sending at least one of the clusters in a second part of an uplink control signalling transmission of a channel to an access node, wherein the uplink control signalling transmission comprises a first part and the second part.

According to a fourth aspect there is provided a method comprising: grouping columns of a linear combination coefficient matrix into a predefined number of clusters; and sending at least one of the clusters in a second part of an uplink control signalling transmission of a channel to an access node, wherein the uplink control signalling transmission comprises a first part and the second part.

According to some examples, the uplink control signalling transmission comprises a channel state information report.

According to some examples, the grouping columns of the linear combination coefficient matrix into a predefined number of clusters is based on frequency domain components indices associated to linear combination coefficients of the linear combination coefficient matrix or is based on the amplitudes of the linear combination coefficients of the linear combination coefficient matrix.

According to some examples, the predefined number of clusters is at least one of: specific to a rank indicator of the channel; common across different rank indicators of the channel; specific to a spatial layer of the channel; and common across different spatial layers of the channel.

According to some examples, the uplink control signalling transmission comprises a frequency domain compressed type II channel state information report.

According to some examples, wherein the method comprises: receiving, in a radio resource configuration message, a number of frequency domain components per cluster in each spatial layer and a maximum number of non-zero linear combination coefficients per cluster in each spatial layer.

According to some examples, the method comprises: determining, from type II codebook parameters, a number of frequency domain components per cluster in each spatial layer and a maximum number of non-zero linear combination coefficients per cluster in each spatial layer.

According to some examples, the type II codebook parameters comprise L, p, β and α parameters.

According to some examples, the method comprises: assigning an index to each of the clusters based on a priority criterion, wherein lower indices are assigned for higher priority clusters.

According to some examples, the priority criterion comprises at least one of: an average amplitude of linear combination coefficients per cluster; a total amplitude of linear combination coefficients per cluster; and indices of the frequency domain components associated to the linear combination coefficients.

According to some examples, when physical uplink shared channel resources are not sufficient to send all of the clusters to the access node, the method comprises: omitting higher index clusters from the second part of the uplink control signalling transmission such that the second part of the uplink control signalling transmission can be accommodated on the physical uplink shared channel scheduled resources.

According to some examples, the method comprises: indicating, in the first part of the uplink control signalling transmission, a presence of at least one omissions of a cluster from the second part of the uplink control signalling transmission.

According to some examples, the indicator is either a standalone bit sequence or a joint encoding with another indicator.

According to some examples, the method is performed by a user equipment.

According to a fifth aspect there is provided a computer program comprising instructions for causing an apparatus to perform at least the following: grouping columns of a linear combination coefficient matrix into a predefined number of clusters; and sending at least one of the clusters in a second part of an uplink control signalling transmission of a channel to an access node, wherein the uplink control signalling transmission comprises a first part and the second part.

According to a sixth aspect there is provided a computer program comprising instructions stored thereon for performing at least the following: grouping columns of a linear combination coefficient matrix into a predefined number of clusters; and sending at least one of the clusters in a second part of an uplink control signalling transmission of a channel to an access node, wherein the uplink control signalling transmission comprises a first part and the second part.

According to a seventh aspect there is provided a non-transitory computer readable medium comprising program instructions for causing an apparatus to perform at least the following: grouping columns of a linear combination coefficient matrix into a predefined number of clusters; and sending at least one of the clusters in a second part of an uplink control signalling transmission of a channel to an access node, wherein the uplink control signalling transmission comprises a first part and the second part.

According to an eighth aspect there is provided a non-transitory computer readable medium comprising program instructions stored thereon for performing at least the following: grouping columns of a linear combination coefficient matrix into a predefined number of clusters; and sending at least one of the clusters in a second part of an uplink control signalling transmission of a channel to an access node, wherein the uplink control signalling transmission comprises a first part and the second part.

According to a ninth aspect there is provided an apparatus comprising means for performing: receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

According to some examples, the uplink control signalling transmission comprises a channel state information report.

According to some examples, the means are further configured to perform: determining the number of clusters; and sending, in a radio resource configuration message to the user equipment, the number of clusters; wherein the number of clusters is at least one of: specific to a rank indicator of the channel; common across different rank indicators of the channel and other channels; specific to a spatial layer of the channel; and common across different spatial layers of the channel.

According to some examples, the means are further configured to perform: determining a number of frequency domain components per cluster in each spatial layer and a size of frequency domain components per cluster in each spatial layer; and sending, to the user equipment, the number of frequency domain components per cluster in each spatial layer and a maximum number of non-zero linear combination coefficients per cluster in each spatial layer.

According to some examples, the means are further configured to perform: receiving, in the first part of the uplink control signalling transmission, an indication of a presence of at least one omissions of a cluster from the second part of the uplink control signalling transmission.

According to some examples, the indicator is either a standalone bit sequence or a joint encoding with another indicator.

According to some examples, the apparatus comprises an access node.

According to some examples, the apparatus comprises a gNB.

According to a tenth aspect there is provided an apparatus comprising at least one processor; and at least one memory including computer program code; the at least one memory and the computer program code configured to, with the at least one processor, cause the apparatus at least to perform: receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

According to some examples, the uplink control signalling transmission comprises a channel state information report.

According to some examples, the at least one processor; and at least one memory including computer program code; the at least one memory and the computer program code configured to, with the at least one processor, cause the apparatus at least to perform: determining the number of clusters; and sending, in a radio resource configuration message to the user equipment, the number of clusters; wherein the number of clusters is at least one of: specific to a rank indicator of the channel; common across different rank indicators of the channel and other channels; specific to a spatial layer of the channel; and common across different spatial layers of the channel.

According to some examples, the at least one processor; and at least one memory including computer program code; the at least one memory and the computer program code configured to, with the at least one processor, cause the apparatus at least to perform: determining a number of frequency domain components per cluster in each spatial layer and a size of frequency domain components per cluster in each spatial layer; and sending, to the user equipment, the number of frequency domain components per cluster in each spatial layer and a maximum number of non-zero linear combination coefficients per cluster in each spatial layer.

According to some examples, the at least one processor; and at least one memory including computer program code; the at least one memory and the computer program code configured to, with the at least one processor, cause the apparatus at least to perform: receiving, in the first part of the uplink control signalling transmission, an indication of a presence of at least one omissions of a cluster from the second part of the uplink control signalling transmission.

According to some examples, the indicator is either a standalone bit sequence or a joint encoding with another indicator.

According to some examples, the apparatus comprises an access node.

According to some examples, the apparatus comprises a gNB.

According to an eleventh aspect there is provided an apparatus comprising: circuitry for receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

According to a twelfth aspect there is provided a method comprising: receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

According to some examples, the uplink control signalling transmission comprises a channel state information report.

According to some examples, the method comprises: determining the number of clusters; and sending, in a radio resource configuration message to the user equipment, the number of clusters; wherein the number of clusters is at least one of: specific to a rank indicator of the channel; common across different rank indicators of the channel and other channels; specific to a spatial layer of the channel; and common across different spatial layers of the channel.

According to some examples, the method comprises: determining a number of frequency domain components per cluster in each spatial layer and a size of frequency domain components per cluster in each spatial layer; and sending, to the user equipment, the number of frequency domain components per cluster in each spatial layer and a maximum number of non-zero linear combination coefficients per cluster in each spatial layer.

According to some examples, the method comprises: receiving, in the first part of the uplink control signalling transmission, an indication of a presence of at least one omissions of a cluster from the second part of the uplink control signalling transmission.

According to some examples, the indicator is either a standalone bit sequence or a joint encoding with another indicator.

According to some examples, the method is performed by an access node.

According to some examples, the method is performed by a gNB.

According to a thirteenth aspect there is provided a computer program comprising instructions for causing an apparatus to perform at least the following: receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

According to a fourteenth aspect there is provided a computer program comprising instructions stored thereon for performing at least the following: receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

According to a fifteenth aspect there is provided a non-transitory computer readable medium comprising program instructions for causing an apparatus to perform at least the following: receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

According to an sixteenth aspect there is provided a non-transitory computer readable medium comprising program instructions stored thereon for performing at least the following: receiving, from a user equipment, at least one cluster in a second part of an uplink control signalling transmission of a channel, wherein the uplink control signalling transmission comprises a first part and the second part; wherein the at least one cluster is formed by the user equipment grouping columns of a linear combination coefficient matrix into a number of clusters.

BRIEF DESCRIPTION OF FIGURES

The invention will now be described in further detail, by way of example only, with reference to the following examples and accompanying drawings, in which.

DETAILED DESCRIPTION

The present disclosure relates to wireless communications. Some examples relate to Channel State Information (CSI) reports.

Figure 1:
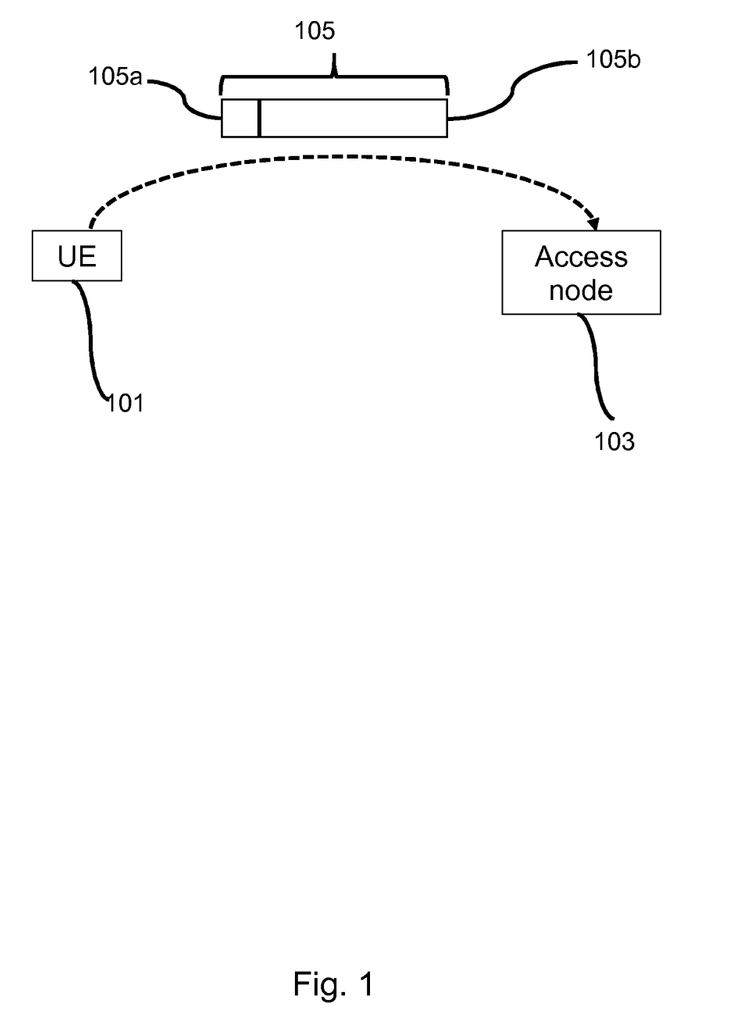
FIG. 1 shows an example network.

FIG. 1 shows an example of a UE 101 connected to an access node 103 of a network. Access node 103 may be a gNB, for example.

In the example of FIG. 1, UE 101 may be connected to access node 103 via a wireless channel. UE 101 may send uplink control signalling 105. The uplink control signalling may comprise a CSI report 105 indicating the state of the channel to access node 103. As shown in FIG. 1, uplink control signalling 105 may be separated into at least two parts, a first part 105a and a second part 105b. In the example of FIG. 1, the payload of second part 105b is greater than the payload of first part 105a.

In Release 15 (Rel. 15) New Radio (NR), two types of CSI feedback are specified, namely, Type I and Type II (3GPP TS 38.214, Physical layer procedures for data (Release 15), 2017). Type II CSI feedback provides improved accuracy by leveraging the linear combination of over-sampled 2D Discrete Fourier Transform (DFT) beams in the spatial domain. However, this improved accuracy comes at the price of a larger feedback overhead. In Type II CSI feedback, a User Equipment (UE) is expected to feedback the indices of the selected beams and the associated quantized wideband and sub-bands coefficients. The resulting overhead can be limited by limiting Rel.15 type II to a maximum rank of 2. Even with this limitation, the allocated Physical Uplink Shared Channel (PUSCH) CSI resources can still fall short from fitting the whole type II codebook payload. Allocated uplink resources by gNB may vary more frequently than CSI report Radio Resource Configuration (RRC) configuration parameters. A discrepancy between what is statistically configured through RRC and the actual dynamic evolution of uplink resource allocation is therefore a possibility.

CSI omission rules can be defined to address the cases where CSI payload exceeds the allocated PUSCH CSI resources, as discussed in "3GPP TS 38.214, Physical layer procedures for data (Release 15), 2017". CSI omission rules can be used to enable the reporting of useful partial Precoder Matrix Indicator (PMI) so that the gNB can still exploit the partial PMI. Rel. 15 CSI omission rules are based on the definition of priority levels for CSI reports and their components. When a mismatch in scheduled PUSCH resources and CSI report payload occurs, Rel. 15 omission rules dictate dropping the CSI portions with the lowest priority levels until the CSI payload fits the allocated PUSCH. Rel. 15 omission rules prioritise the following parts in order of priority:

Wideband CSI for all CSI reports;

Sub-bands payload of CSI reports, where prioritization is based on the report index and where high priority is given to the lowest indices;

For a given CSI report, payload of even sub-bands is prioritized.

Since the main overhead in type II codebook comes from reporting the sub-bands coefficients, Rel. 15 CSI omission may group the sub-bands coefficients into two portions of different priorities. In case PUSCH resources fall short from fitting all the sub-bands coefficients, odd sub-bands are dropped. Although this results in a decrease in the PMI accuracy, the gNB may acquire enough information to perform subsequent beamforming, especially when the PMI is highly correlated in the frequency domain. In addition, to avoid ambiguity between the UE and gNB, CSI omission is only applicable on Uplink Control Information (UCI) part 2.

In order to enable high rank type II CSI while preserving its accuracy, Rel.16 CSI uses frequency domain PMI compression based on a Discrete Fourier Transform (DFT) codebook.

In Rel-16 type II codebook, a UE applies compression in the spatial domain (SD) and frequency domain (FD) to a matrix of coefficients representing the collection of precoding vectors for a given spatial layer for all the configured sub-bands in the CSI report configuration. A spatial layer may be linked to an antenna port in some examples. In some examples, a spatial layer can be formed by one or more physical antenna elements using different weightings for transmission. In Rel. 16 type II codebook, the PMI matrix for a spatial layer is given by $$W = W_1 \tilde{W}_2 W_f^H \quad (1)$$

W is of size $2N_1N_2 \times N_3$, where $N_1$ and $N_2$ are the numbers of antenna ports associated to two polarisations used by cross-polarized transmit antenna array of the UE and $N_3$ is the number of configured PMI sub-bands in Radio Resource Configuration (RRC). $W_1$ is a spatial compression matrix which columns represent the components of a Space-Domain (SD) orthogonal basis of size 2L. The columns of $W_f$ form a Frequency Domain (FD) orthogonal basis of size M, and $\tilde{W}_2$ is a 2L×M matrix of complex-valued Linear Combination Coefficient (LCCs). H represents a Hermitian operator. The components of the SD and FD bases are selected from a 2D DFT codebook and a 1D (DFT) codebook, respectively. The PMI report for a spatial layer comprises an indicator for the SD basis subset selection, an indicator for the FD basis subset selection, a 2L×M bitmap indicating the location of the $K_{NZ}$ non-zero coefficients in the $\tilde{W}_2$ matrix and the quantized values of these non-zero coefficients. These elements are indicated in the second part of the uplink control signalling (for example, in part 105b of FIG. 1).

Although, as discussed in "R1-1902562, CSI Overhead Reduction for Type II codebook up to rank 2, Nokia, Nokia Shanghai Bell, 2019", considerable overhead reduction is achieved using FD DFT-based compression, CSI report payload can still exceed the allocated PUSCH resources. Rel. 16 type II codebook payload has a considerable dependency on the selected rank by the UE which may lead to disparity between PUSCH resources and CSI report overhead.

As Rel. 16 type II codebook is based on FD compression, some of the Rel. 15 CSI omission rules discussed above are no longer applicable, as there is no PMI coefficient reporting per sub-band. Indeed, Rel. 16 type II PMI coefficients are reported based on a set of selected DFT components per spatial layer.

The payload of the Rel. 16 type II CSI depends on several parameters, such as the active BWP width and PMI frequency granularity in addition to L, p, β and α values described in "R1-1906965, Feature lead summary of MU-MINO CSI, Samsung, 2019". p and β values can be used to define, respectively, the number of FD components to select for each spatial layer for a given RI and the total number of LCCs. The value of L refers to the number of spatial domain beams per polarization. The value of α may be considered to set the width of a window from which select FD components are selected. The supported values for the parameters (L, p, β, α) will be discussed in future as only specific combinations can be supported since these parameters have direct incidence on the PMI accuracy and UCI payload. The agreements reached in: "R1-1906965, Feature lead summary for MU-MIMO CSI, Samsung, 2019"; "R1-1906966, Feature lead summary on offline email discussion for MU-MIMO CSI: UCI parameters, Samsung, 2019"; and "R1-1906967, Feature lead summary on offline email discussion for MU-MIMO CSI: FD basis subset selection, Samsung, 2019" show the mutual dependency between Rel. 16 type II codebook parameters.

Fourier-based compression of a correlated signal tends to focus the signal energy in the "low-pass" components which results in a strong correlation between Non-Zero Coefficient (NZC) amplitude and FD component indices. Consequently, the first FD components are often selected for all or a majority of spatial layers. In addition, given the agreed Strongest Coefficient Indicator (SCI) reporting scheme in Rel. 16 type II codebook (see "R1-1907319, On UCI reporting of SCI and FD basis, Nokia, Nokia Shanghai Bell, 2019"), the FD component #0 per spatial layer conveys the strongest coefficient, which is set to 1 as it is used to normalize other LCC coefficients before quantization. The few first FD components per spatial layer therefore transport a large amount of information on the PMI. If the CSI report is only restricted to these few components together with their LCC and corresponding bitmap, substantial amount of information on the PMI can still be conveyed.

In some examples, the UE might be able to reduce the payload of the CSI report substantially for an acceptable penalty in terms of PMI accuracy. A framework for CSI omission that aims at reducing the frequency of CSI dropping for the case scheduled PUSCH resources which are too small to fit the entire payload of Rel.16 type II codebook may therefore be used.

In some examples, when deriving the payload of the Rel. 16 type II CSI, after deriving the spatial layer-common $W_1$, spatial layer-specific $W_f$ matrices and LCC matrices spatial per layer $\tilde{W}_2$, a UE will perform further enhancement by defining FD clusters per spatial layer and by defining their corresponding payloads.

Figure 2:
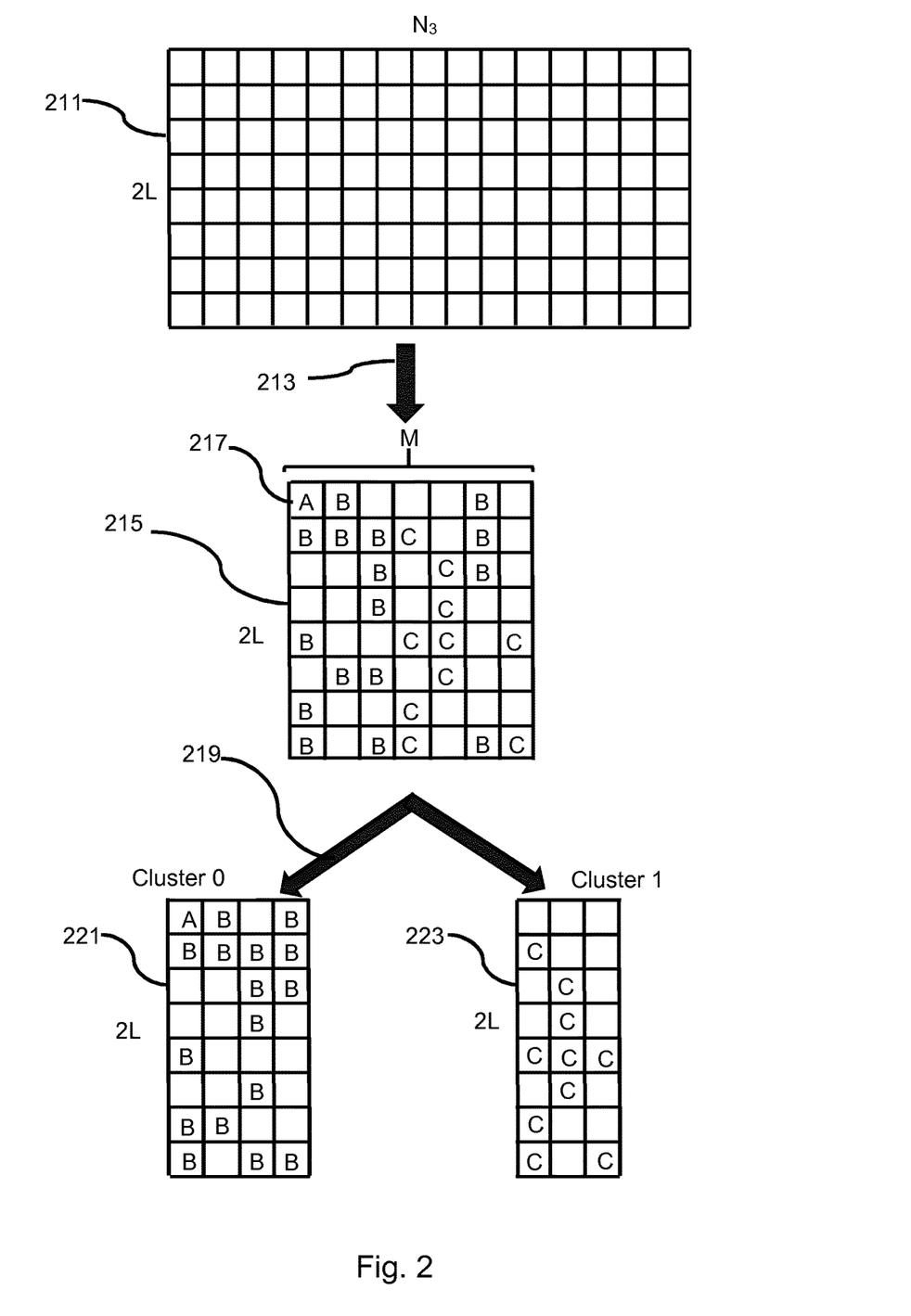
FIG. 2 shows an example of a data algorithm.

FIG. 2 shows an example where a UE performs further enhancement by defining FD clusters per spatial layer and by defining their corresponding payloads. FIG. 2 shows an example of FD clustering, applied on one spatial layer of a PMI. An $N_3$ by 2L matrix 211 of the coefficients representing the collection of precoding vectors for a given spatial layer for all the configured sub-bands in the CSI report configuration undergoes FD compression at 213 to provide a $\tilde{W}_2$ matrix 215 of complex-valued LC coefficients (an LCC matrix). A $\tilde{W}_2$ matrix is provided for each spatial layer. The UE can then form FD clusters per layer for the $\tilde{W}_2$ matrix of each spatial layer.

In $\tilde{W}_2$ matrix 215, coefficient 217 is strongest and has the largest amplitude. Coefficient 217 is marked by an "A" in FIG. 2. The position of coefficient 217 can be indicated by an SCI. The value of coefficient 217 may be normalized to 1. The value can be normalized Coefficient B in $\tilde{W}_2$ matrix

215 denotes LCC in cluster 0. Coefficient C in $\tilde{W}_2$ matrix 215 denotes LCC in cluster 1. Blank squares represent zero coefficients.

At step 219, a UE can group the LCCs into clusters (partitions). In some examples, the UE can decide which LCCs to combine into a cluster based on the frequency domain components indices of the LCCs. In some examples, the UE can decide which LCCs to combine into a cluster based on the amplitude of linear combination coefficients. For example, the UE could use a clustering algorithm such as k-mean to group the LCCs into clusters.

In some examples, grouping (clustering) by the UE may be performed based on the FD component index of each LCC. The UE may allocate LCCs to clusters according to an increasing selected FD component index order. The first cluster may contain the LCCs that are associated with the selected FD components having the lowest indices. Allocation of the rest of the LCCs will follow the same reasoning by allocating the LCCs that are associated with the lowest index selected FD components to the lowest index cluster that has available capacity (i.e. the maximum number of LCCs per cluster is not yet reached).

In some examples, grouping (clustering) by the UE may be performed based on the amplitude of each of the columns of the $\tilde{W}_2$ matrix 215. A clustering algorithm such as the k-mean algorithm may be used.

In both grouping (clustering) based on the FD component index of each LCC and based on the amplitude of each of the columns, LCCs having the same associated FD component are clustered together.

In order to form clusters, additional higher layer defined parameters can be used. In some examples, the number of FD clusters per layer w can be denoted by $N_{c,l}$, l=1 ... RI, where RI stands for "Rank Indicator". The size of each of the clusters can be denoted by $S_{i,l}$, i=0, ... $N_{c,l}$−1, l=1 ... RI.

The number of FD clusters and the sizes of the FD clusters may be the same, or may be different among spatial layers. The number of FD clusters, the sizes of the FD clusters and a maximum number of non-zero linear combination coefficients per cluster may be communicated to a UE in RRC messages from an access node or preconfigured. For example, the number of FD clusters and the sizes of the FD clusters may be communicated as part of a CSI-ReportConfig message in RRC. The UE allocates FD components to $N_{c,l}$ clusters per spatial layer, denoted by $C_{i,l}$, i=0 ... $N_{c,l}$−1, l=1 ... RI. The PMI payload in the second part of the uplink control signalling, e.g., UCI in Rel. 15/16, is consequently divided into $\Sigma_{l=1}^{RI} N_{c,l}$ parts, including bitmaps and LCC quantization bits.

The UE allocates indices to the FD clusters, which can be used in a CSI omission rule as priority levels. In some examples, the indices of the FD clusters per spatial layer are allocated as follows:

The cluster containing the strongest coefficient is given the lowest index (Highest priority).

The indices of the other clusters are a decreasing function of the conveyed information by the cluster. As an example, total or average amplitude of LCC coefficients per cluster may be used as a metric to quantify the cluster priority.

In the example of FIG. 2, coefficient 217 is the strongest and therefore the cluster comprising coefficient 217 is assigned the lowest index. In the example of FIG. 2, this cluster is cluster 221. The remaining cluster 223 is assigned the second-lowest index.

In NR Rel. 16, type II CSI is compressed in the frequency domain using a DFT codebook. Fourier-based compression of a correlated signal focuses the signal energy in the "low-pass" components, which results in a strong correlation between Non-Zero Coefficient (NZC) amplitude and FD component indices, as discussed in "R1-1902562, CSI Overhead Reduction for Type II codebook up to rank 2, Nokia, Nokia Shanghai Bell, 2019". This property can be verified by simulation results where FD components with low indices have higher probability to be selected by the UE to compress all channel layers in FD. In addition, the low index FD components tend to concentrate most of the information for each spatial layer. This property can be used in combination with the FD clusters formed as described above.

According to the aforementioned FD cluster indexing, efficient CSI omission rules can be defined as most of the PMI information is conveyed in the low index FD clusters. Consequently, in case where PUSCH resources are too small to fit the entire CSI report payload, for a given set of values for the parameters (L, p, β, α), clusters with the highest index are dropped from UCI sent from the UE to the access node (i.e. is dropped from CSI reports sent from UE to access node). In some examples, the bitmap and LCC coefficients of clusters with the highest indices are dropped. This rule enables a reduction in the probability of dropping of entire CSI reports with a small cost in terms of PMI accuracy.

The number of clusters to be dropped may be spatial layer-common or spatial layer-specific. The number of cluster to be dropped may be Rank Indicator common (RI-common) or Rank Indicator specific (RI-specific).

In some examples, a UE may choose to drop more payload information from the weakest spatial layers of a data channel. In this case, a first part of the uplink control signalling, e.g., UCI in Rel. 15/16, such as part 105a, can be used to include an indication of the number of dropped FD clusters per spatial layer. This indication may be conveyed in an indicator field in the first part of the uplink control signalling or jointly encoded with other parameters (for example, with the number of non-zero coefficients).

In some examples, a UE may use a fall-back indicator in a first part of the uplink control signalling to indicate a partial dropping of a second part of the uplink control signalling. This indicator may be included, for example, in part 105a of uplink control signalling transmission 105. The partial dropping may occur due to the omission rule described above. In some examples, the fall-back indicator may be one bit.

In some examples, a fall-back indicator per spatial layer is used in order to indicate that partial dropping of a second part of the uplink control signalling has occurred for a limited number of spatial layers.

An inclusion of the above-described indicators can be accommodated by a modification in a first part of the uplink control signalling to account for the additional fall-back bits. According to some examples, the proposed indicator in a first part of the uplink control signalling might notify a drop in the values of the parameters p and β which define, respectively, the number of FD components to select for each spatial layer for a given RI, and the total number of LCCs.

In some examples, when CSI omission occurs, the UE updates the number of non-zero coefficients in order to reflect the remaining LCCs in the sent report. In addition, the number of remaining FD components may be indicated through an update in the field used for FD component signalling. Since an explicit CSI omission indicator is added in the first part of the uplink control signalling, the gNB will be able to correctly decode the updated FD basis subset selection indicator in the second part of the uplink control signalling.

According to some examples, a UE can inform an access node (for example, a gNB) about the omitted parts in the second part of the CSI report using a joint encoding with one of the fields in the first part of uplink control signalling. For example, codepoints associated to the lowest values of $K_{NZ}$, e.g., 0, 1 and 2, are reserved and used to signal partial or full omission. For example, these codepoints may be reserved to indicate at least one of: M'=M (no omissions); M'=⌈M/2⌉ (partial omissions); and M'=0 (full omissions). A UE can then report the reduced-size FD basis subset in the second part of uplink control signalling and the remaining NZC in the updated subset. This can be useful as in some cases, lower values of $K_{NZ}$ are arguably detrimental for the codebook performance, as shown and discussed in "R1-1907719, On the proposals for Rel-16 strongest coefficient indicator, Nokia, Nokia Shanghai Bell, 2019". Reserving the codepoints associated to these values for jointly encoding an indicator would therefore not have a negative impact on the downlink performance, and it does not increase the overhead of the first part of the uplink control signalling, e.g., UCI.

According to some examples, separate indications in a first part of the UCI sent from a UE to an access node may be used to indicate LCC and bitmap dropping, respectively. In some examples, the number of LCCs in UCI may be reduced rather than removing the bitmap of the UCI in order to fit a CSI report in the allocated PUSCH resources. The first part of uplink control signalling (e.g. part 105a) can be used to notify LCC dropping or bitmap dropping. In some examples, LCC dropping may occur without any bitmap information being dropped. In other examples, some bitmap information may be dropped without dropping any LCC information.

In some examples, LCC or bitmap payload information may be dropped from high index FD clusters, where the high index FD clusters are assigned as described above with relation to FIG. 2.

In some examples, one or more indicators in the first part of uplink control signalling can be used to indicate a drop in the values of p, L and β, which can be used to signify a drop in the LCC payload information and a drop in the bitmap payload information respectively.

After omission of data from a CSI report, a UE can update a field in the first part of uplink control signalling that indicates the number of non-zero coefficients, regardless of how this number is indicated (whether it is indicated independently or jointly with another indicator).

Figure 3:
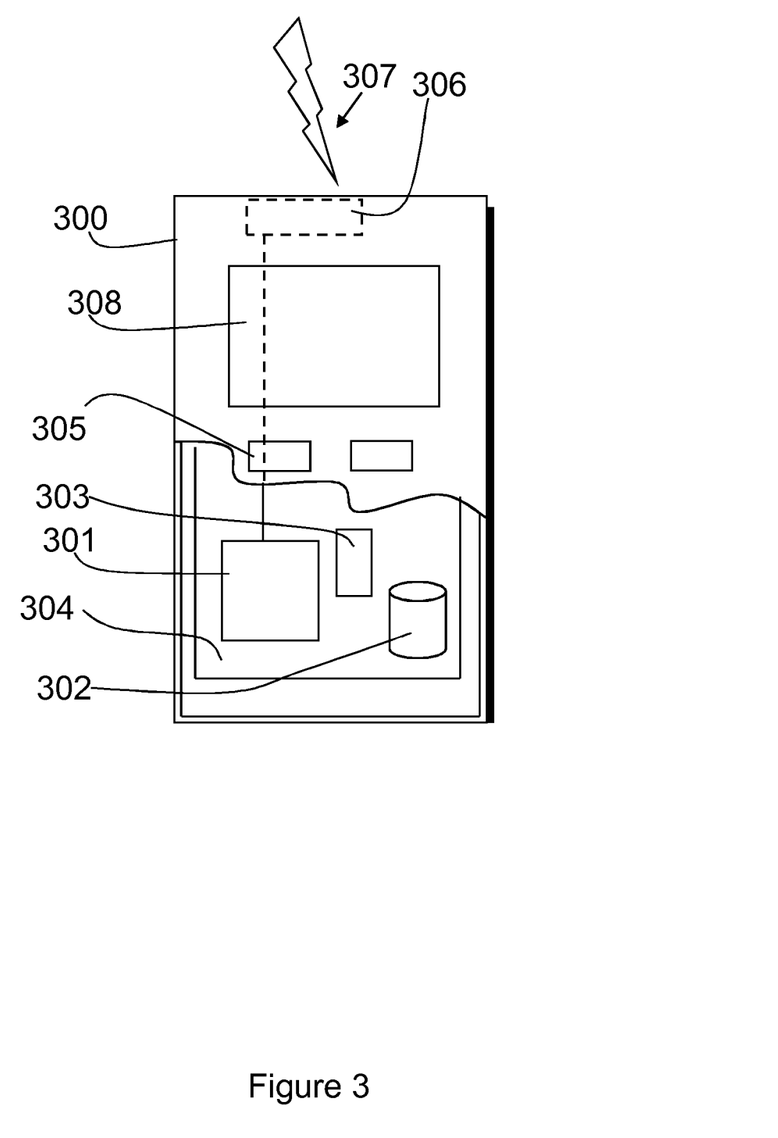
FIG. 3 shows a schematic representation of an apparatus according to an example.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto. The communication devices 302, 304, 305 may access the communication system based on various access techniques.

Figure 4:
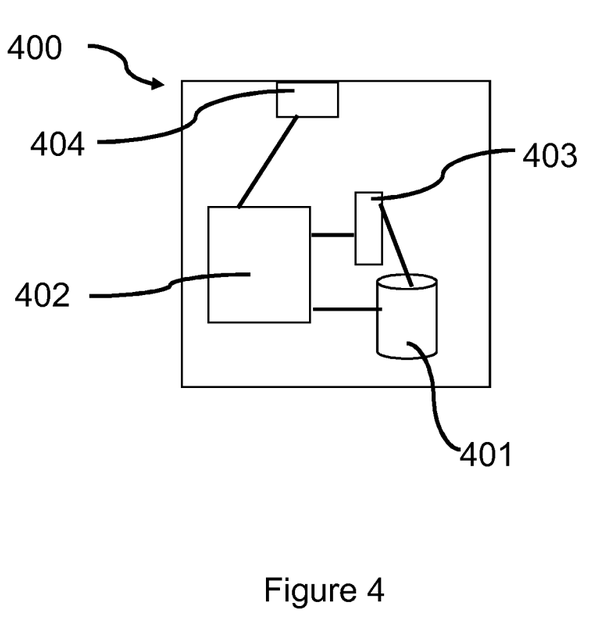
FIG. 4 shows a schematic representation of an apparatus according to an example.

FIG. 4 shows an example of a control apparatus for a communication system, for example to be coupled to and/or for controlling a station of an access system, such as an access node, e.g. a base station, gNB, a central unit of a cloud architecture or a node of a core network such as an MME or S-GW, a scheduling entity such as a spectrum management entity, or a server or host, or an IAB or relay node. The control apparatus may be integrated with or external to a node or module of a core network or RAN. In some example embodiments, base stations comprise a separate control apparatus unit or module. In other example embodiments, the control apparatus can be another network element such as a radio network controller or a spectrum controller. In some example embodiments, each base station may have such a control apparatus as well as a control apparatus being provided in a radio network controller. The control apparatus 400 can be arranged to provide control on communications in the service area of the system. The control apparatus 400 comprises at least one memory 401, at least one data processing unit 402, 403 and an input/output interface 404. Via the interface the control apparatus can be coupled to a receiver and a transmitter of the base station. The receiver and/or the transmitter may be implemented as a radio front end or a remote radio head. For example the control apparatus 400 or processor 401 can be configured to execute an appropriate software code to provide the control functions.

Figure 5:
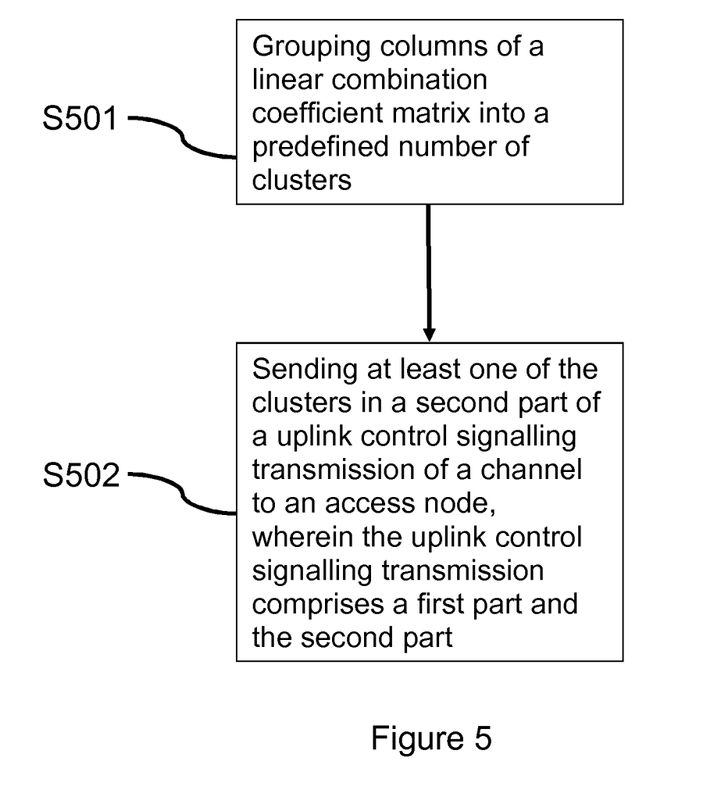
FIG. 5 shows a flow diagram of a method according to an example.

FIG. 5 is a flow chart of a method according to an example. The flow chart of FIG. 5 is viewed from the perspective of an apparatus such as UE 101.

S501 comprises grouping columns of a linear combination coefficient matrix into a predefined number of clusters.

In some examples, the linear combination coefficient matrix comprises a $\tilde{W}_2$ matrix described above. In some examples, the grouping of the columns is based on the indexes of the frequency domain components indices of the LCCs. In some examples, the UE can decide which LCCs to combine into a cluster based on the amplitude of linear combination coefficients.

S502 comprises sending at least one of the clusters in a second part of an uplink control signalling transmission of a channel to an access node, wherein the uplink control signalling transmission comprises a first part and the second part.

Figure 6:
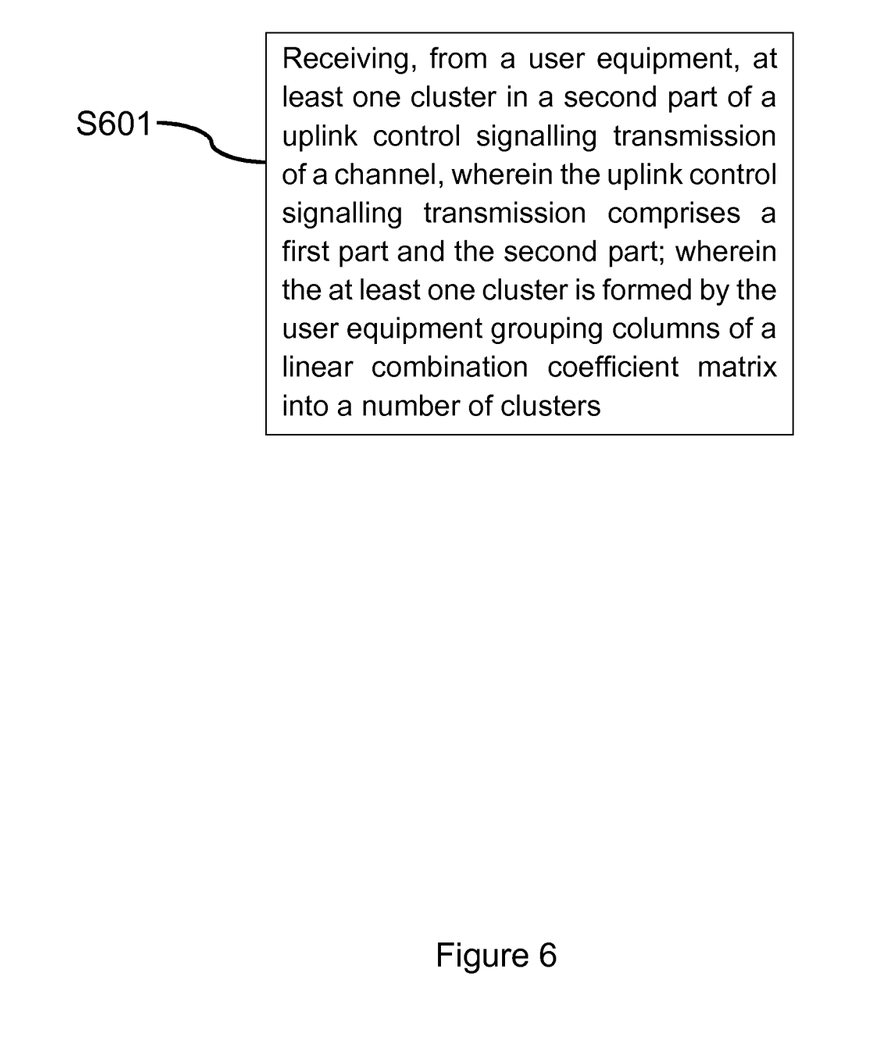
FIG. 6 shows a flow diagram of a method according to an example.

FIG. 6 is a flow chart of a method according to an example. The flow chart of FIG. 6 is viewed from the perspective of an apparatus such as access node 103.

S601 comprises receiving, from a user equipment, at least one cluster in a second part of a uplink control signalling transmission of a channel, wherein the uplink control signalling transmission comprises a first part and the second part; wherein the at least one cluster is formed by the user equipment grouping columns of a linear combination coefficient matrix into a number of clusters.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further exemplary embodiments comprising a combination of one or more exemplary embodiments with any of the other exemplary embodiments previously discussed.

The invention claimed is:
1. An apparatus comprising:
at least one processor; and
at least one memory including computer program code;

the at least one processor and the computer program code configured to, with the at least one processor, cause the apparatus to:
group columns of a linear combination coefficient matrix into a predefined number of clusters;
assign an index to each of the clusters based on a priority criterion, wherein lower indices are assigned for higher priority clusters;
send at least one of the clusters in a second part of an uplink control signalling transmission of a channel to an access node, wherein the uplink control signalling transmission comprises a first part and the second part; and
wherein the priority criterion comprises at least one of:
an average amplitude of linear combination coefficients per cluster; and
indices of the frequency domain components associated to the linear combination coefficients.

2. The apparatus according to claim 1, wherein the grouping columns of the linear combination coefficient matrix into a predefined number of clusters is based on frequency domain components indices associated to linear combination coefficients of the linear combination coefficient matrix or is based on the amplitudes of the linear combination coefficients of the linear combination coefficient matrix.

3. The apparatus according to claim 1, wherein the predefined number of clusters is at least one of:
specific to a rank indicator of the channel;
common across different rank indicators of the channel;
specific to a spatial layer of the channel; and
common across different spatial layers of the channel.

4. The apparatus according to claim 1, wherein the uplink control signalling transmission comprises a frequency domain compressed type II channel state information report.

5. The apparatus according to claim 1, wherein the at least one processor and the computer program code are further configured to:
receive, in a radio resource configuration message, a number of frequency domain components per cluster in each spatial layer and a maximum number of non-zero linear combination coefficients per cluster in each spatial layer.

6. The apparatus according to claim 1, wherein the at least one processor and the computer program code are further configured to:
determine, from type II codebook parameters, a number of frequency domain components per cluster in each spatial layer and a maximum number of non-zero linear combination coefficients per cluster in each spatial layer.

7. The apparatus according to claim 1, wherein when physical uplink shared channel resources are not sufficient to send all of the clusters to the access node, the at least one processor and the computer program code are further configured to:
omit higher index clusters from the second part of the uplink control signalling transmission such that the second part of the uplink control signalling transmission can be accommodated on the physical uplink shared channel scheduled resources.

8. The apparatus according to claim 1, wherein the at least one processor and the computer program code are further configured to:
indicate, in the first part of the uplink control signalling transmission, a presence of at least one omissions of a cluster from the second part of the uplink control signalling transmission.

9. The apparatus according to claim 8, wherein the indicator is either a standalone bit sequence or a joint encoding with another indicator.

10. An apparatus comprising:
at least one processor; and
at least one memory including computer program code;
the at least one processor and the computer program code configured to, with the at least one processor, cause the apparatus to:
receive, from a user equipment, at least one cluster in a second part of an uplink control signalling transmission of a channel, wherein the uplink control signalling transmission comprises a first part and the second part;
wherein the at least one cluster is formed by the user equipment grouping columns of a linear combination coefficient matrix into a number of clusters;
wherein each of the clusters has an associated index based on a priority criterion, wherein lower indices are associated with higher priority clusters; and
wherein the priority criterion comprises at least one of:
an average amplitude of linear combination coefficients per cluster; and
indices of the frequency domain components associated to the linear combination coefficients.

11. The apparatus according to claim 10, wherein the at least one processor and the computer program code are further configured to:
determine the number of clusters; and
send, in a radio resource configuration message to the user equipment, the number of clusters; wherein the number of clusters is at least one of:
specific to a rank indicator of the channel;
common across different rank indicators of the channel and other channels;
specific to a spatial layer of the channel; and
common across different spatial layers of the channel.

12. The apparatus according to claim 10, wherein the at least one processor and the computer program code are further configured to:
determine a number of frequency domain components per cluster in each spatial layer and a size of frequency domain components per cluster in each spatial layer; and
send, to the user equipment, the number of frequency domain components per cluster in each spatial layer and a maximum number of non-zero linear combination coefficients per cluster in each spatial layer.

13. The apparatus according to claim 10, wherein the at least one processor and the computer program code are further configured to:
receive, in the first part of the uplink control signalling transmission, an indication of a presence of at least one omissions of a cluster from the second part of the uplink control signalling transmission.

14. The apparatus according to claim 13, wherein the indicator is either a standalone bit sequence or a joint encoding with another indicator.

15. A method comprising:
grouping columns of a linear combination coefficient matrix into a predefined number of clusters;
assigning an index to each of the clusters based on a priority criterion, wherein lower indices are assigned for higher priority clusters;

sending at least one of the clusters in a second part of an uplink control signalling transmission of a channel to an access node, wherein the uplink control signalling transmission comprises a first part and the second part; and wherein the priority criterion comprises at least one of:
an average amplitude of linear combination coefficients per cluster; and
indices of the frequency domain components associated to the linear combination coefficients.

16. The method according to claim 15, wherein the grouping columns of the linear combination coefficient matrix into a predefined number of clusters is based on frequency domain components indices associated to linear combination coefficients of the linear combination coefficient matrix or is based on the amplitudes of the linear combination coefficients of the linear combination coefficient matrix.

17. The method according to claim 15, wherein the predefined number of clusters is at least one of:
specific to a rank indicator of the channel;
common across different rank indicators of the channel; specific to a spatial layer of the channel; and
common across different spatial layers of the channel.

18. A method comprising:
receiving, from a user equipment, at least one cluster in a second part of an uplink control signalling transmission of a channel, wherein the uplink control signalling transmission comprises a first part and the second part;
wherein the at least one cluster is formed by the user equipment grouping columns of a linear combination coefficient matrix into a number of clusters; and
wherein each of the clusters has an associated index based on a priority criterion, wherein lower indices are associated with higher priority clusters;
wherein the priority criterion comprises at least one of:
an average amplitude of linear combination coefficients per cluster; and
indices of the frequency domain components associated to the linear combination coefficients.

19. The apparatus of claim 1, wherein the cluster containing a strongest linear combination coefficient is assigned a lowest index, and the cluster is a highest priority cluster.

* * * * *